United States Patent
Tewes

(10) Patent No.: US 8,539,095 B2
(45) Date of Patent: Sep. 17, 2013

(54) RELIABLE MESSAGE TRANSFER

(75) Inventor: Martin Tewes, Dossenheim (DE)

(73) Assignee: SAP AG, Walldorf (DE)

(*) Notice: Subject to any disclaimer, the term of this patent is extended or adjusted under 35 U.S.C. 154(b) by 339 days.

(21) Appl. No.: 12/947,010

(22) Filed: Nov. 16, 2010

(65) Prior Publication Data
US 2012/0124234 A1    May 17, 2012

(51) Int. Cl.
*G06F 15/16* (2006.01)
(52) U.S. Cl.
USPC .................................. 709/236; 709/230
(58) Field of Classification Search
USPC .................................. 709/230, 236
See application file for complete search history.

(56) References Cited

U.S. PATENT DOCUMENTS

2005/0005232 A1* 1/2005 Gosby ........................... 715/500
2007/0143406 A1* 6/2007 Collet et al. .................. 709/206

* cited by examiner

*Primary Examiner* — Wing F Chan
*Assistant Examiner* — Andrew Woo

(57) ABSTRACT

Various embodiments of systems and methods for reliable message transfer are described herein. In a sender adapter, at least one message is divided into a plurality of message chunks based on a predetermined chunk size. A chunk key is assigned to each of the message chunk to correspond to each message. Further, a chunk sequence key is generated for each of the message chunks to identify a sequence of the message chunks. The plurality of message chunks including the corresponding chunk key and the chunk sequence key is transmitted to a receiver adapter. At the receiver adapter, the plurality of message chunks including the corresponding chunk key and the chunk sequence key are received. Further, the message chunks are grouped based on the corresponding chunk key and each message is reconstructed from the message chunks based on the corresponding chunk sequence key.

16 Claims, 8 Drawing Sheets

RELIABLE MESSAGE TRANSFER

FIELD

Embodiments generally relate to computer systems and more particularly to methods and systems for reliable message transfer.

BACKGROUND

In an enterprise, communication system plays a vital role for transferring data from one point to another. Enterprise, which involves typical business processes span across different business systems. Also, some processes even span across the boundaries of the enterprise to communicate to a third party system. These processes include exchange of electronic documents. In order to establish such inter and intra enterprise business processes, infrastructure is provided for a messaging system, which includes a set of techniques for exchange of electronic documents among multiple threads in one or more processes. For example, NetWeaver Process Integration (PI) of SAP® provides such an infrastructure. However, the current infrastructure has one or more limitations as described below.

Currently, reliable message transfer is limited to an available memory heap size when processed. If a message having a message size that exceeds the memory heap size is being transferred, the messaging system will throw an error and the message transmission will not be achieved. Therefore, the message heap size must be as big as the maximum message size during processing of the message, which is resource intensive. For example, for every single message, an upper limit of the message size has to be defined for transferring each message. Also, reliability in such message transfer may not be guaranteed. In other words, if the transfer breaks down, the process of transferring has to be commenced from the beginning.

Therefore, a technique for overcoming the above mentioned limitations by providing reliable transfer of messages without having a size limit would be desirable.

SUMMARY

Various embodiments of systems and methods for reliable message transfer by processing messages without having a size limit are described herein. In a sender adapter, at least one message is divided into a plurality of message chunks based on a predetermined chunk size. A chunk key is assigned to the plurality of message chunks which correspond to each message. Further, a chunk sequence key is generated for each of the plurality of message chunks to identify a sequence of the plurality of message chunks in each message based on the assigned chunk key. The plurality of message chunks including the corresponding chunk key and the chunk sequence key are transmitted to a receiver adapter. In one embodiment, each of the plurality of message chunks comprises an electronic envelope including a header and a body. The header of the electronic envelope is dynamically configured to comprise a sender ID, a receiver ID, a time stamp, the chunk key, the chunk sequence key, the chunk size and a chunk mode, and the body of the electronic envelope comprises a part of payload data of the at least one message based on the predetermined chunk size.

At the receiver adapter, the plurality of message chunks including the corresponding chunk key and the chunk sequence key are received. Further, the plurality of message chunks are grouped based on the corresponding chunk key and the message is reconstructed from the plurality of message chunks based on the corresponding chunk sequence key.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for reliable message transfer by processing messages without having a size limit are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
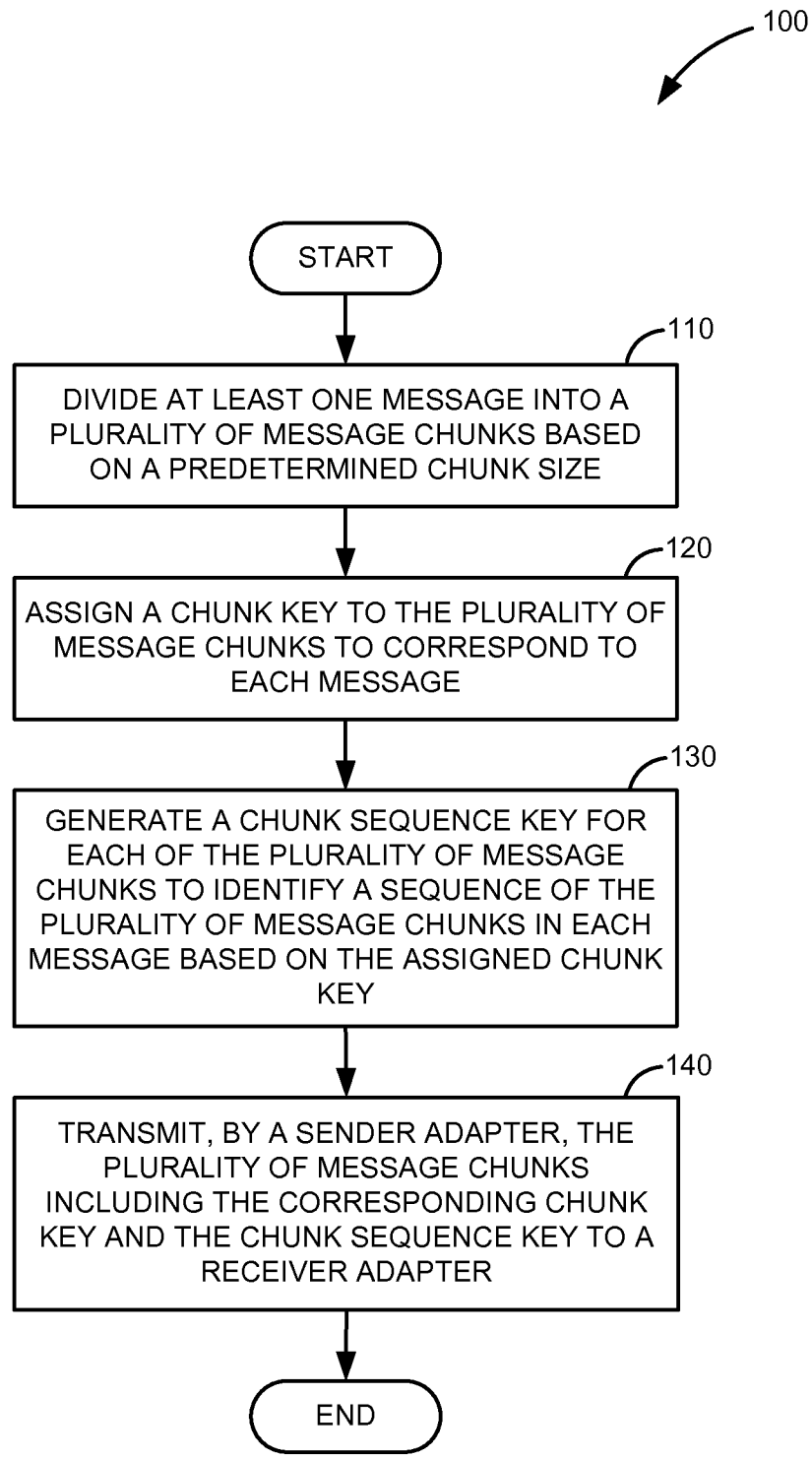
FIG. 1 is a flow diagram illustrating a method of processing at least one message by a sender adapter, according to an embodiment.

FIG. 1 is a flow diagram 100 illustrating a method of processing at least one message by a sender adapter, according to an embodiment. At step 110, at least one message is divided into a plurality of message chunks based on a predetermined chunk size. In one embodiment, large size messages or messages without size limits can be transferred by dividing the message into the plurality of message chunks. In these embodiments, the messages can be transmitted without changing the heap size parameters or overloading the heap of memory of the sender adapter. In one exemplary embodiment, a message can include an electronic document of a business application without message size limit in form of an extensible markup language (XML), a non-XML, a web service description language (WSDL), a semi or unstructured document, a simple object access protocol (SOAP) and the like. In one embodiment, the predetermined chunk size is configured based on the processing capability of the sender adapter.

At step 120, a chunk key is assigned to the plurality of message chunks to correspond to each message. For example, the message chunks associated with a message are assigned with a common chunk key. In other words, the chunk key is used to identify the message from which the message chunks are generated. At step 130, a chunk sequence key is generated for each of the plurality of message chunks to identify a sequence of the plurality of message chunks in each message based on the assigned chunk key. For example, if a message is divided into five message chunks, then the chunk sequence key is generated for each of the five message chunks, which helps to reconstruct the message at a receiver adapter.

At step 140, the plurality of message chunks including the corresponding chunk key and the chunk sequence key are transmitted to the receiver adapter. In an embodiment, each message chunk includes an electronic envelope. The electronic envelope includes a header and a body. The header of the electronic envelope is dynamically configured to include a sender ID, a receiver ID, a time stamp, the chunk key, the chunk sequence key, the chunk size and a chunk mode, and the body of the electronic envelope includes a part of payload data of the message based on the predetermined chunk size. In one embodiment, the chunk mode includes an end mode to identify a last chunk message of the plurality of chunk messages and an active mode to identify other chunk messages of the plurality of chunk messages. The structure of the electronic envelope is described in greater detail in FIG. 3.

Figure 2:
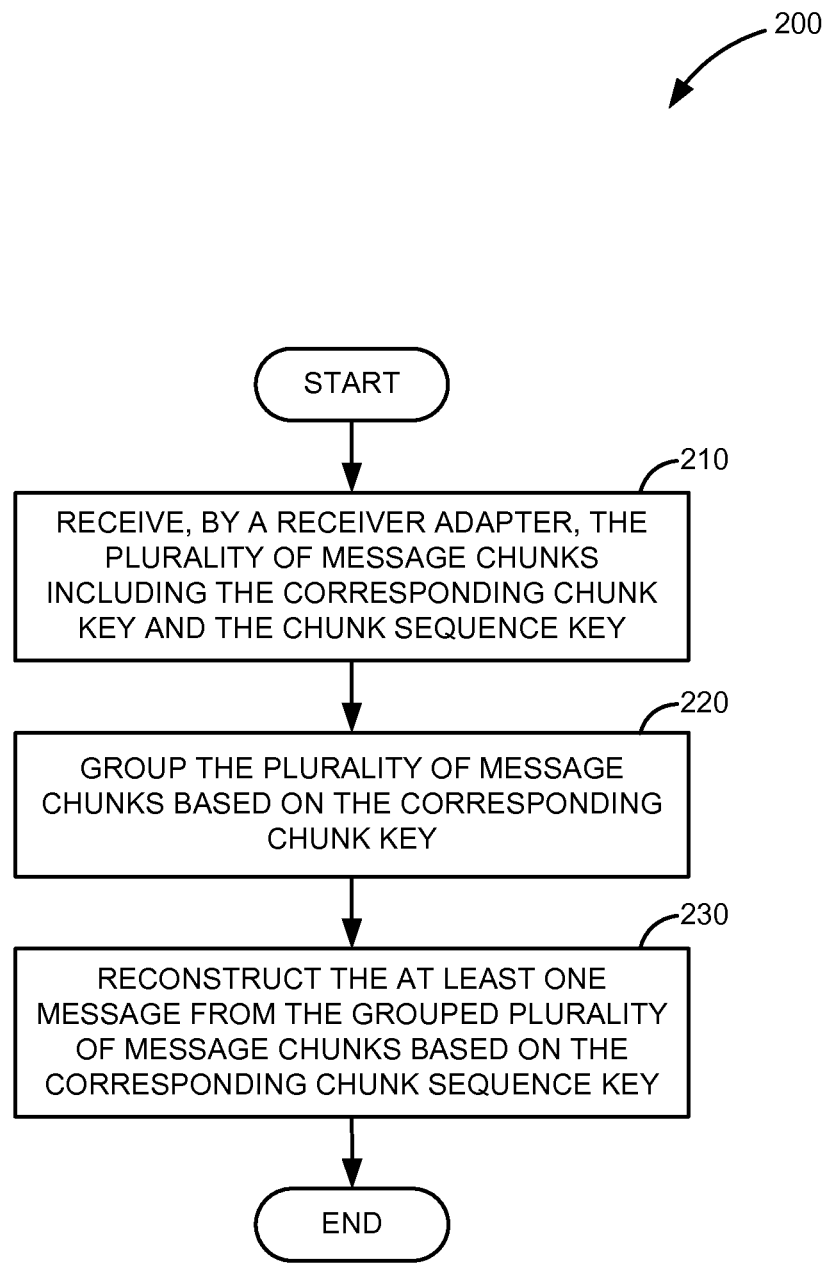
FIG. 2 is a flow diagram illustrating a method of reconstructing the at least one message of FIG. 1 in a receiver adapter, according to an embodiment.

FIG. 2 is a flow diagram 200 illustrating a method of reconstructing the at least one message of FIG. 1 in a receiver adapter, according to an embodiment. At step 210, the plurality of message chunks including the corresponding chunk key and the chunk sequence key are received by the receiver adapter. At step 220, the plurality of message chunks are grouped based on the corresponding chunk key. In one exemplary embodiment, a temporary file is created in the receiver adapter to store the grouped plurality of message chunks. At step 230, the at least one message of FIG. 1 is reconstructed from the grouped plurality of message chunks based on the corresponding chunk sequence key. The method as described in FIGS. 1 and 2 are described in greater detail with an exemplary system in FIG. 3.

Figure 3:
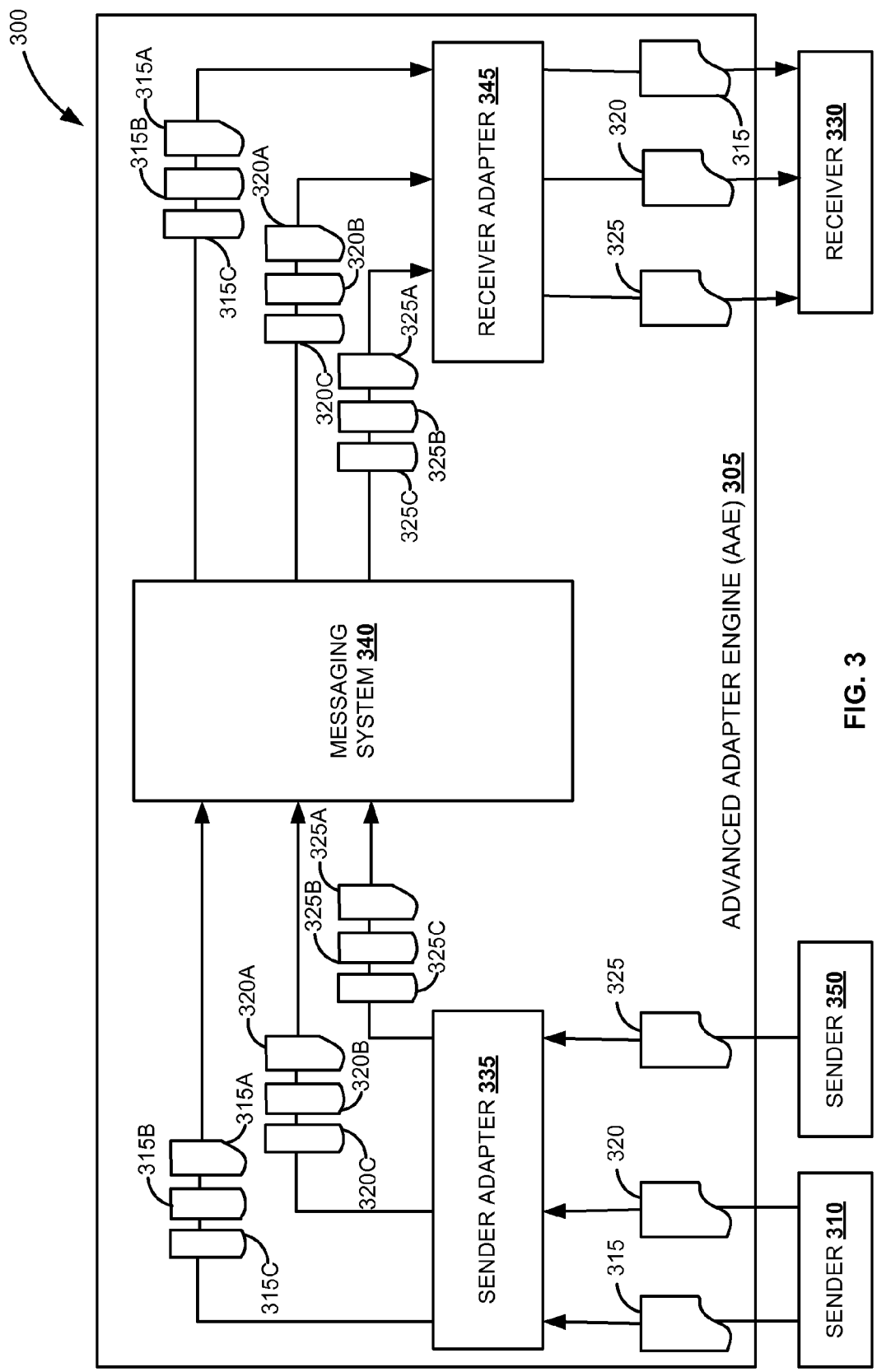
FIG. 3 is an exemplary architecture of a system for reliable message transfer, according to an embodiment.

FIG. 3 is an exemplary architecture of a system 300 for reliable message transfer, according to an embodiment. In one exemplary implementation, the system diagram 300 shows a schematic architecture of an advanced adapter engine (AAE) 305. The AAE 305 includes a sender adapter 335 coupled to one or more senders (e.g., senders 310 and 350) to transfer messages (e.g., messages 315, 320 and 325) to a dedicated receiver (e.g., receiver 330). The AAE 305 further includes a receiver adapter 345 to receive the transferred messages through a messaging system 340. The messaging system 340 manages the messages database persistency and schedule of the message processing worker threads. In other words, the messaging system 340 communicatively couples the sender adapter 335 and the receiver adapter 345 via a network. Further, the receiver adapter 345 is coupled to one or more receivers (e.g., receiver 330) to deliver the messages (e.g., messages 315, 320 and 325), which are transferred from the sender adapter 335. In one exemplary embodiment, the sender (e.g., senders 310 and 350) and the receiver (e.g., receiver 330) refers to a computer, a third party system, external application, application storage, other mechanism or actors capable of sending and receiving the messages.

In operation, one or more messages (e.g., 315, 320 and 325) are transferred from the one or more senders (e.g., messages 315 and 320 are transferred from the sender 310, and message 325 is transferred from the sender 350) to deliver to the dedicated receiver (e.g., receiver 330) through AAE 305. In one embodiment, the sender adapter 335 divides each message (e.g., message 315, 320 and 325) into a plurality of message chunks (e.g., message 315 is divided into message chunks 315A, 315B and 315C, message 320 is divided into message chunks 320A, 320B and 320C, and message 325 is divided into message chunks 325A, 325B and 325C). The messaging system 340 is protocol agnostic, therefore each message chunk (e.g., message chunks 315A to 315C, 320A to 320C, and 325A to 325C) includes an electronic envelope consisting of a header and a body. In one embodiment, the header is dynamically configured to include a chunk key, a chunk sequence key, a chunk mode, and a chunk size. The dynamic configuration of the header is described in greater detail in FIG. 4. In one exemplary embodiment, the plurality of message chunks is persisted within the messaging system 340. Thus, the message chunks can be read successfully to the messaging system 340 even if the receiver adapter 345 is not available.

In one exemplary embodiment, the plurality of message chunks (e.g., message chunks 315A to 315C, 320A to 320C, and 325A to 325C) are transferred in the order in which the plurality of message chunks (e.g., message chunks 315A to 315C, 320A to 320C, and 325A to 325C) are generated to the receiver adapter 345 through the messaging system 340.

Further in operation at the receiver adapter 345, the plurality of message chunks (e.g., message chunks 315A to 315 C, 320A to 320C, and 325A to 325C) are grouped according to the associated chunk key. In one exemplary embodiment, a temporary file is created to store the plurality of message chunks corresponding to each message based on the associated chunk key (e.g., message chunks 315A to 315B are grouped together; message chunks 320A to 320C are grouped together; and message chunks 325A to 325C are grouped together). Further, the grouped plurality of message chunks are arranged in a sequence as per the associated chunk sequence key to reconstruct each message (e.g., messages 315, 320 and 325) as transmitted from the senders (e.g., senders 310 and 350). In one embodiment, when the connectivity between the sender adapter 335 and the receiver adapter 345 is temporarily lost, no message chunks are lost or duplicated. The message chunks which are not transmitted will be transferred to the receiver adapter 345, than transmitting the whole message as in conventional system when the connection is established. Thus, reliability of message transfer is achieved. Also, occurrence of errors is optimized as only message chunks are transferred.

Figure 4:
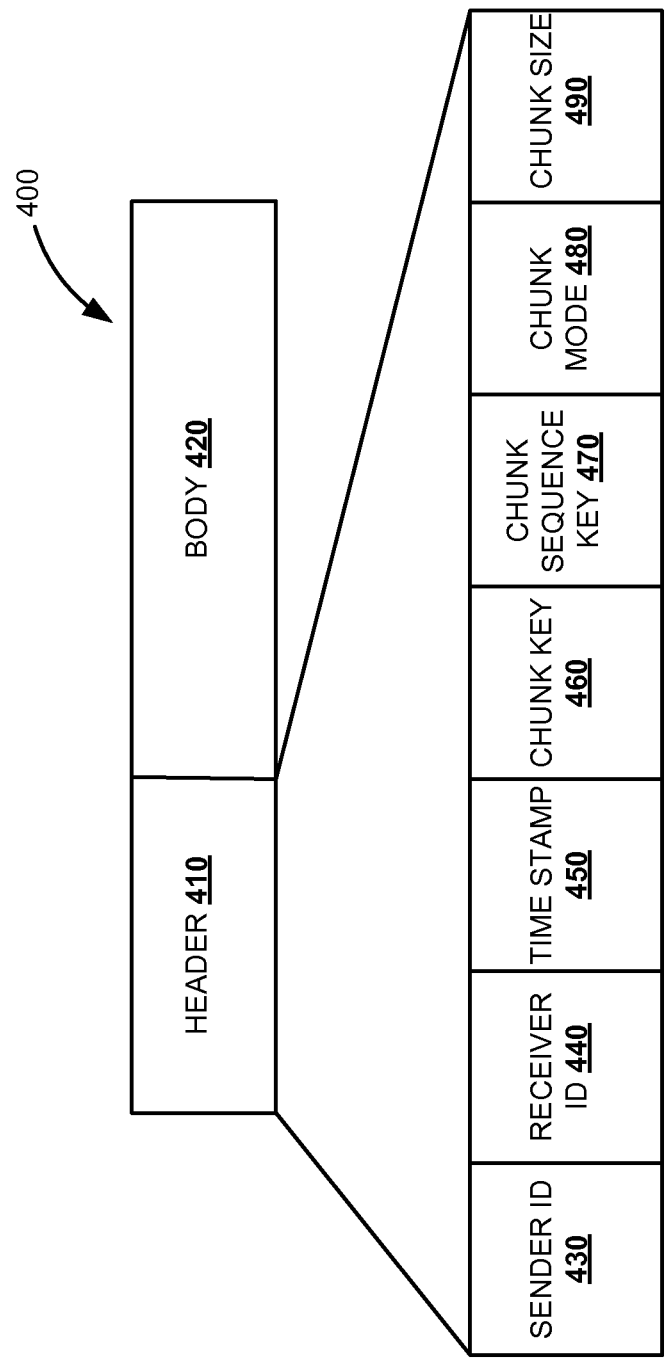
FIG. 4 illustrates a protocol structure of a message chunk, according to an embodiment.

FIG. 4 illustrates a protocol structure 400 of a message chunk, according to an embodiment. In one embodiment, the message chunk is represented as an electronic envelope, including a header 410 and a body 420. In one embodiment, the header 410 is dynamically configured to include a sender ID 430, a receiver ID 440, a time stamp 450, a chunk key 460, a chunk sequence key 470, a chunk mode 480, and a chunk size 490. The sender ID 430 provides information of a source of a message or a sender. The receiver ID 440 provides information of a destination where the message is to be transferred or a receiver. The time stamp 450 includes time at which the message is transferred.

In one embodiment, the chunk key 460 provides information of the message from which each of the plurality of message chunks are generated. The chunk key 460 helps to group the plurality of message chunks at a receiver adapter. For example, the chunk key for each message chunk associated with a particular message includes a common alphanumeric code. In one embodiment, the chunk sequence key 470 provides information to identify a sequence of the plurality of message chunks in each message. The chunk sequence key 470 helps to reconstruct the message from the plurality of message chunks in a correct sequence. The chunk mode 480 includes an end mode to identify a last chunk message of the plurality of chunk messages and an active mode to identify other chunk messages of the plurality of chunk messages. In other words, the last chunk message includes chunk mode 480 as 'end' and the other chunk messages include chunk mode 480 as 'active', which helps the receiver adapter to know the end of the plurality of chunk messages. In one embodiment, the chunk size 490 depicts the size of the message payload as in the body 420 of the electronic envelope. In general, the message protocol is enhanced with parameters that allow dividing messages at the sender adapter and reconstructing the same messages at the receiver adapter. In one embodiment, the dynamically configured parameters are defined on top of a current message protocol. Thus, monitoring and runtime infrastructure of a conventional infrastructure is completely utilized. An example of the header 410 is described in greater detail in FIG. 5A to 5C.

Figure 5A:
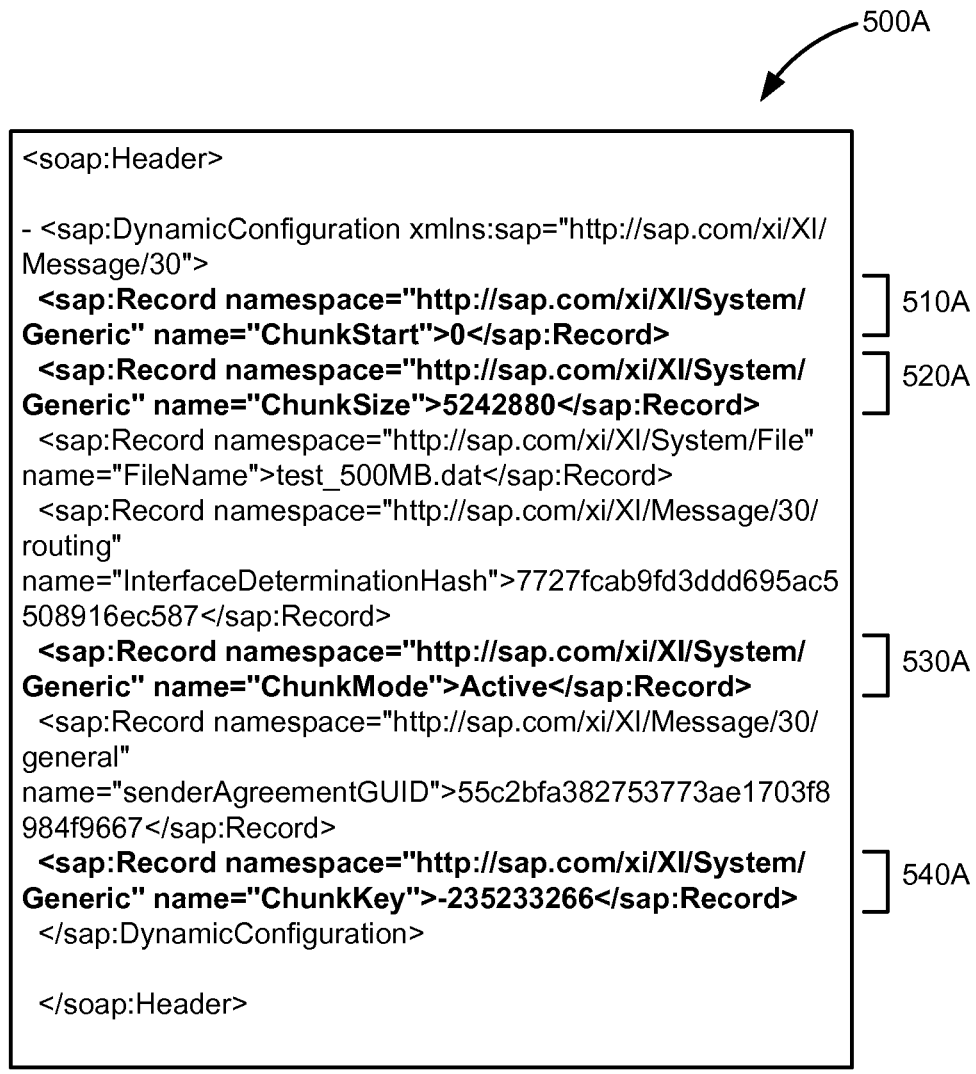
FIGS. 5A to 5C illustrate exemplary headers of a plurality of message chunks of a message, according to an embodiment.
Figure 5B:
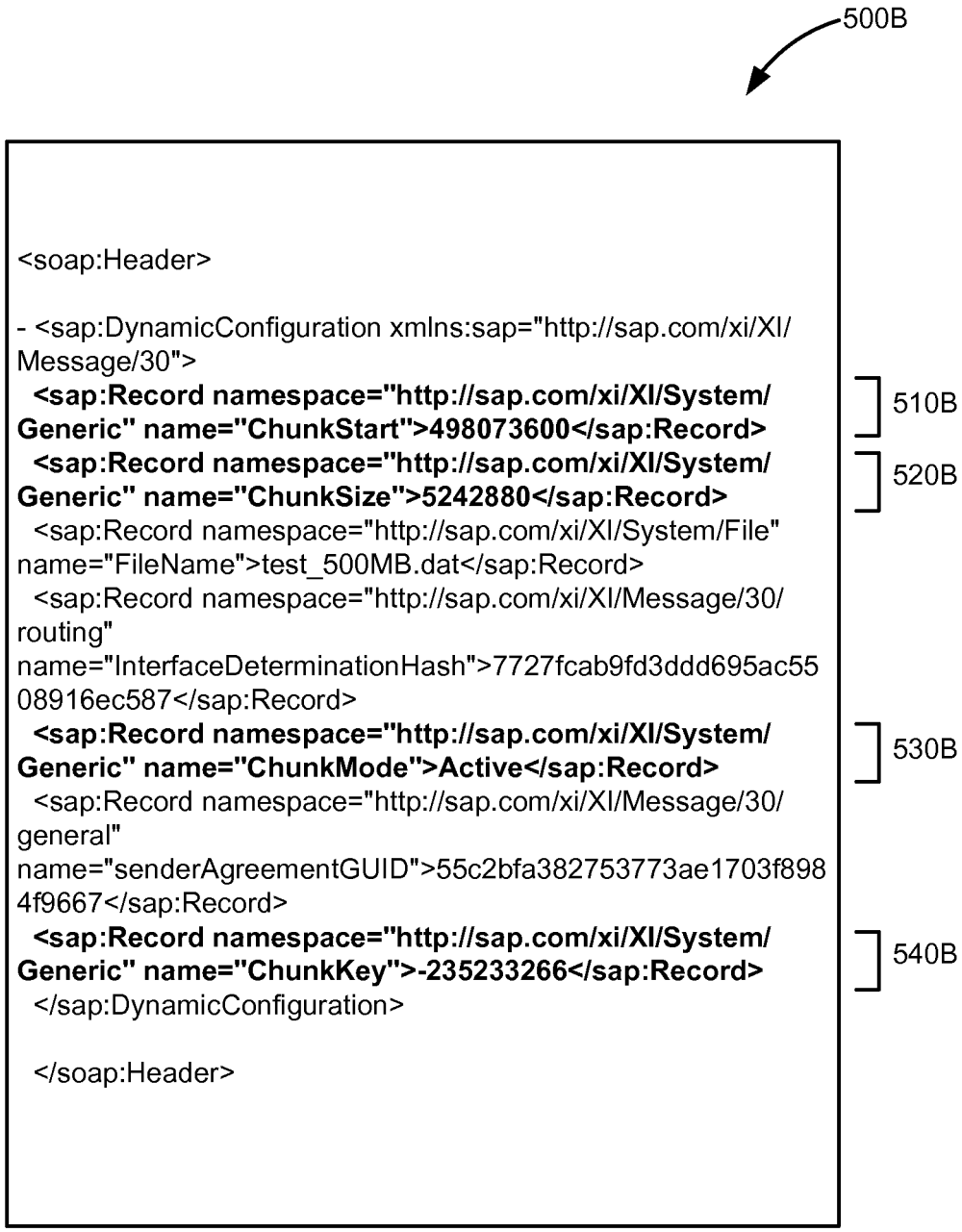
Figure 5C:

FIGS. 5A to 5C illustrate exemplary headers (e.g., 500A, 500B, and 500C) of a plurality of message chunks of a message, according to an embodiment. A message which has to be transferred to a dedicated receiver is divided into the plurality of message chunks at a sender adapter. The header of the plurality of message chunks is dynamically configured to include a chunk sequence key, a chunk size, a chunk mode, and a chunk key. FIG. 5A is an exemplary header 500A of a first message chunk of the plurality of message chunks, FIG. 5B is an exemplary header 500B of a last but one message chunk of the plurality of message chunks, and FIG. 5C is an exemplary header 500C of a last message chunk of the plurality of message chunks. In one embodiment, a chunk start key or a chunk sequence key (e.g., 510A of FIG. 5A, 510B of FIG. 5B, and 510C of FIG. 5C) for each message chunk is defined, wherein each chunk sequence key is assigned an alphanumerical value to identify the sequence of the plurality of message chunks of each message. For example, the numerical value '0' denotes that the message chunk is the first message chunk of the plurality of message chunks as in 510A of FIG. 5A. The numerical values '498073600' and '503316480' denote the order in which the message chunks has to be placed during reconstruction of the message at the receiver adapter as in 510B and 510C of FIGS. 5B and 5C respectively.

In one embodiment, a chunk size (e.g., 520A of FIG. 5A, 520B of FIG. 5B, and 520C of FIG. 5C) provides a size of the payload of each chunk message of the message. For example, the chunk size 520A '5242880' is the payload size of the first message chunk as in FIG. 5A. The chunk size 520B '5242880' is the payload size of the last but one message chunk as in FIG. 5B. Further, the chunk size '4715564' is the payload size of the last message chunk as in FIG. 5C. In general, each message chunk includes the message payload of same chunk size as configured in the sender adapter (e.g., 520A and 520B) except for the last message chunk, which includes the message payload of the chunk size as configured or less than the configured chunk size (e.g., 520C).

In one embodiment, the chunk mode (e.g., 530A of FIG. 5A, 530B of FIG. 5B, and 530C of FIG. 5C) is defined, wherein the chunk mode provides information whether a message chunk is the last message chunk of the plurality of message chunks of the message. For example, the chunk modes 530A and 530B depicts as 'active', indicating the message chunk is not the last message chunk of the plurality of message chunks. Further, the chunk mode 530C depicts as 'end', indicating the message chunk as the last message chunk of the plurality of message chunks.

In one embodiment, a chunk key (e.g., 540A of FIG. 5A, 540B of FIG. 5B, and 540C of FIG. 5C) is defined, wherein the chunk key is assigned an alphanumerical value. The numerical value '235233266' denotes that the message chunk belongs to a particular message. Since the plurality of message chunks as depicted (only headers) in FIGS. 5A to 5C belongs to the same message, all chunk keys (e.g., 510A of FIG. 5A, 510B of FIG. 5B, and 510C of FIG. 5C) are assigned a common unique number.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
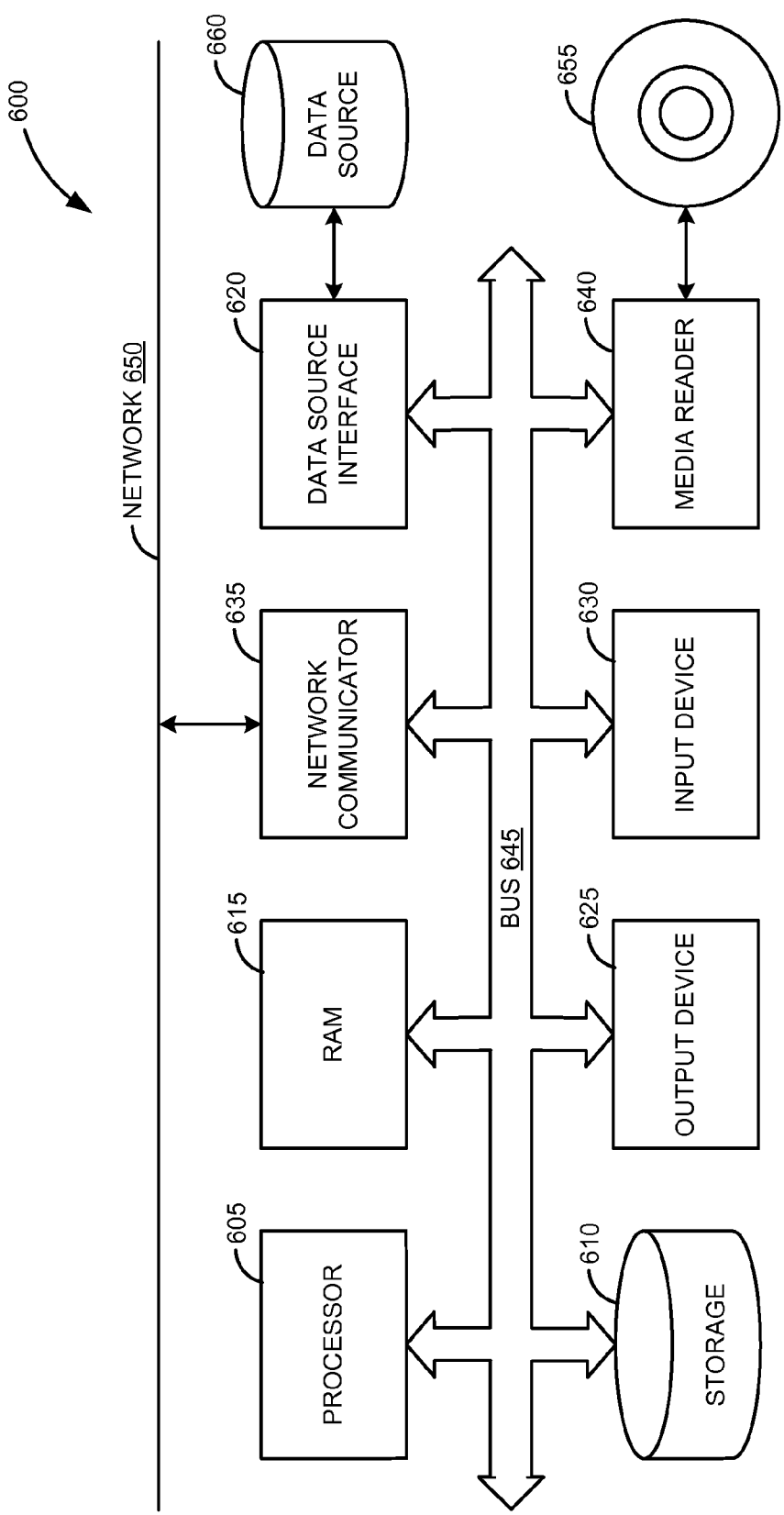
FIG. 6 is a block diagram illustrating a computing environment in which the techniques described for reliable message transfer can be implemented, according to an embodiment.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   divide at least one message into a plurality of message chunks based on a predetermined chunk size wherein the predetermined chunk size is based on a processing capability of a sender adapter;
   assign a chunk key to the plurality of message chunks to correspond to each message;
   generate a chunk sequence key for each of the plurality of message chunks to identify a sequence of the plurality of message chunks in each message based on the assigned chunk key;
   transmit, by a sender adapter, the plurality of message chunks including the corresponding chunk key and the chunk sequence key to a receiver adapter,
   wherein the receiver adapter receives the plurality of message chunks including the corresponding chunk key and the chunk sequence key;
   groups the plurality of message chunks based on the corresponding chunk key; and
   reconstructs the at least one message from the grouped plurality of message chunks based on the corresponding chunk sequence key.

2. The article of manufacture of claim 1, wherein the at least one message comprises an electronic document of a business application in a form selected from the group consisting of an extensible markup language (XML), a web service description language (WSDL), a semi or unstructured document, and a simple object access protocol (SOAP).

3. The article of manufacture of claim 1, wherein each of the plurality of message chunks comprises an electronic envelope including a header and a body.

4. The article of manufacture of claim 3, wherein the header of the electronic envelope is dynamically configured to comprise a sender ID, a receiver ID, a time stamp, the chunk key, the chunk sequence key, the chunk size and a chunk mode, and the body of the electronic envelope comprises a part of payload data of the at least one message based on the predetermined chunk size.

5. The article of manufacture of claim 4, wherein the chunk mode comprises an end mode to identify a last chunk message of the plurality of chunk messages and an active mode to identify other chunk messages of the plurality of chunk messages.

6. The article of manufacture of claim 1, wherein the sender adapter and the receiver adapter are connected via a network.

7. A computerized method for reliable processing of at least one message, the method comprising:
dividing the at least one message into a plurality of message chunks based on a predetermined chunk size, wherein the predetermined chunk size is based on a processing capability of a sender adapter;
assigning a chunk key to the plurality of message chunks corresponding to each message;
generating a chunk sequence key for each of the plurality of message chunks to identify a sequence of the plurality of message chunks in each message based on the assigned chunk key;
transmitting, by the sender adapter, the plurality of message chunks including the corresponding chunk key and the chunk sequence key to a receiver adapter,
wherein the receiver adapter receives the plurality of message chunks including the corresponding chunk key and the chunk sequence key;
groups the plurality of message chunks based on the corresponding chunk key; and
reconstructs the at least one message from the plurality of message chunks based on the corresponding chunk sequence key.

8. The computerized method of claim 7, wherein the at least one message comprises an electronic document of a business application in a form selected from the group consisting of an extensible markup language (XML), a web service description language (WSDL), a semi or unstructured document, and a simple object access protocol (SOAP).

9. The computerized method of claim 7, wherein each of the plurality of message chunks comprises an electronic envelope including a header and a body.

10. The computerized method of claim 9, wherein the header of the electronic envelope is dynamically configured to comprise a sender ID, a receiver ID, a time stamp, the chunk key, the chunk sequence key, the chunk size and a chunk mode, and the body of the electronic envelope comprises a part of payload data of the at least one message based on the predetermined chunk size.

11. The computerized method of claim 10, wherein the chunk mode comprises an end mode to identify a last chunk message of the plurality of chunk messages and an active mode to identify other chunk messages of the plurality of chunk messages.

12. The computerized method of claim 7, wherein the sender adapter and the receiver adapter are connected via a network.

13. A computer system for reliable processing of at least one message, comprising:
a memory to store program code;
a processor to execute the program code;
a sender adapter connected to the memory and the processor, wherein the sender adapter is configured to:
divide the at least one message into a plurality of message chunks based on a predetermined chunk size, wherein the predetermined chunk size is based on a processing capability of the sender adapter;
assign a chunk key to the plurality of message chunks to corresponding to each message;
generate a chunk sequence key for each of the plurality of message chunks to identify a sequence of the plurality of message chunks in each message based on the assigned chunk key; and
transmit, by a sender adapter, the plurality of message chunks including the corresponding chunk key and the chunk sequence key to a receiver adapter configured to:
receive the plurality of message chunks including the corresponding chunk key and the chunk sequence key;
group the plurality of message chunks based on the corresponding chunk key; and
reconstruct the at least one message from the plurality of message chunks based on the corresponding chunk sequence key.

14. The computer system of claim 13, further comprising a messaging system connects the sender adapter and the receiver adapter via a network.

15. The computer system of claim 13, wherein the at least one message comprises an electronic document of a business application and each of the plurality of message chunks comprises an electronic envelope including a header and a body.

16. The computer system of claim 15, wherein the header of the electronic envelope is dynamically configured to comprise a sender ID, a receiver ID, a time stamp, the chunk key, the chunk-start key, the chunk size and a chunk mode, and the body of the electronic envelope comprises a part of payload data of the at least one message based on the predetermined chunk size.

* * * * *